(12) United States Patent
Callaway et al.

(10) Patent No.: US 8,812,622 B2
(45) Date of Patent: Aug. 19, 2014

(54) APPLICATION OPTIMIZATION IN A NETWORK SYSTEM

(75) Inventors: Robert David Callaway, Holly Springs, NC (US); Gennaro A. Cuomo, Cary, NC (US); Victor S. Moore, Lake City, FL (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/106,860

(22) Filed: May 13, 2011

(65) Prior Publication Data

US 2012/0290687 A1    Nov. 15, 2012

(51) Int. Cl.
| | |
|---|---|
| G06F 15/16 | (2006.01) |
| H04L 29/08 | (2006.01) |
| G06F 9/00 | (2006.01) |
| H04L 12/24 | (2006.01) |
| H04L 29/06 | (2006.01) |
| G06F 15/173 | (2006.01) |
| G06F 12/08 | (2006.01) |

(52) U.S. Cl.
CPC . *H04L 67/00* (2013.01); *G06F 9/00* (2013.01); *H04L 41/14* (2013.01); *H04L 41/22* (2013.01); *H04L 69/04* (2013.01); *G06F 15/173* (2013.01); *G06F 12/08* (2013.01)
USPC ............................ 709/219; 709/217; 375/219

(58) Field of Classification Search
CPC ..... H04L 67/00; H04L 41/14; H04L 43/0876; H04L 43/026; H04L 42/22; H04L 67/2847; H04L 67/28; H04L 67/02; H04L 69/04; H04L 63/029; G06F 15/16; G06F 9/00; G06F 15/173; G06F 21/00; G06F 12/08
USPC ........................................................ 709/219
See application file for complete search history.

(56) References Cited

U.S. PATENT DOCUMENTS

| | | | |
|---|---|---|---|
| 6,182,086 B1 * | 1/2001 | Lomet et al. | 1/1 |
| 7,054,337 B2 | 5/2006 | Jackson, III | |
| 2001/0014895 A1 * | 8/2001 | Sappal | 707/500 |

(Continued)

OTHER PUBLICATIONS

Davis—"Cisco administration 101: Monitor network traffic with NetFlow", Original Publisher: TechRepublic (Jun. 2006).

(Continued)

*Primary Examiner* — Oleg Survillo
*Assistant Examiner* — Mehulkumar Shah
(74) *Attorney, Agent, or Firm* — David Mims; Mark P Kahler

(57) ABSTRACT

A network system includes multiple network resource information handling systems (IHSs) for managing applications and application communications. An IHS operating system initializes an application optimizer to provide application acceleration capability to application optimizers, such as application delivery controllers (ADCs) and wide area network (WAN) optimizer controllers (WOCs) within the network system. Upon receipt of a server application request message (SARM), a network system server responds with a restful application optimizer message (RAOM) that includes protocol, policy, and other application optimizer information that pertains to the requesting SARM. Application optimizers may include clients, ADCs and WOCs that reside within the message communication path between client and server. Application optimizers may store protocol, policy, and other information from RAOM to populate application table data. Application optimizers intercept messages between network resources of the network system and apply message policies to improve message performance thereby improving application performance within the network system.

4 Claims, 5 Drawing Sheets

(56) References Cited

U.S. PATENT DOCUMENTS

| | | | |
|---|---|---|---|
| 2003/0126231 A1* | 7/2003 | Jang et al. | 709/218 |
| 2003/0195904 A1* | 10/2003 | Chestnut et al. | 707/204 |
| 2003/0231747 A1* | 12/2003 | Creamer et al. | 379/88.17 |
| 2007/0011317 A1* | 1/2007 | Brandyburg et al. | 709/224 |
| 2008/0229017 A1* | 9/2008 | Plamondon | 711/118 |
| 2008/0281908 A1* | 11/2008 | McCanne et al. | 709/203 |
| 2008/0307219 A1* | 12/2008 | Karandikar | 713/153 |
| 2009/0016271 A1 | 1/2009 | Li | |
| 2010/0138505 A1* | 6/2010 | Joy et al. | 709/206 |
| 2010/0146074 A1 | 6/2010 | Srinivasan | |
| 2010/0211673 A1 | 8/2010 | Kosbab | |
| 2011/0047610 A1* | 2/2011 | Mylavarapu et al. | 726/12 |
| 2011/0277027 A1* | 11/2011 | Hayton et al. | 726/8 |
| 2011/0280244 A1* | 11/2011 | Gopinath et al. | 370/392 |
| 2012/0023077 A1* | 1/2012 | Kann et al. | 707/702 |
| 2012/0072523 A1* | 3/2012 | Michels et al. | 709/212 |
| 2012/0144015 A1* | 6/2012 | Jalan et al. | 709/224 |
| 2012/0188905 A1* | 7/2012 | Dandekar et al. | 370/254 |
| 2012/0253780 A1* | 10/2012 | Talla et al. | 703/23 |
| 2012/0284416 A1* | 11/2012 | Li et al. | 709/228 |
| 2012/0317276 A1* | 12/2012 | Muniraju | 709/224 |

OTHER PUBLICATIONS

Hemminger—"The Future of Application Delivery", INTEROP New York/Mobile Business Expo 2008—downloaded from http://www.interop.com/newyork/2008/presentations/conference/ad31-hemminger.pdf (2008).

Microsoft—"A Short Overview of QoS Mechanisms and Their Interoperation" (downloaded form http://technet.microsoft.com/en-us/library/bb742477.aspx on Feb. 2011) (dated Nov. 1999).

Rickard—"Improving Application Performance in a Hybrid Cloud World", Gartner Inc. (2010).

Riley—"Deep Packet Inspection:", freepress, www.freepress.net (Mar. 2009).

Datapower—"DataPower Option for Application Optimization", IBM (Copyright 2011).

Rodriguez—"2844—Introducing Application Optimization in WebSphere DataPower SOA Appliances", Impact2010 (Copyright 2009).

Subbu—"Performance of RESTful Apps", downloaded from http://www.subbu.org/blog/2011/03/performance-of-restful-apps on Apr. 6, 2011 (on-line publication dated Mar. 4, 2011).

* cited by examiner

APPLICATION MESSAGE ATTRIBUTES

| | |
|---|---|
| 310 | SOURCE IP |
| 311 | SOURCE PORT |
| 312 | DESTINATION IP |
| 313 | DESTINATION PORT |
| 314 | APPICATION PROTOCOL |
| 315 | APPLICATION |
| 316 | COMPRESSIBILITY |
| 317 | DATA LENGTH |
| 318 | QUEUE LENGTH |
| 319 | HEALTH |
| 320 | MEASURED NETWORK LATENCY |
| 321 | REQUESTED BANDWIDTH |
| 322 | CACHE UPDATES |
| 323 | OTHER |

APPLICATION OPTIMIZATION IN A NETWORK SYSTEM

BACKGROUND

The disclosures herein relate generally to network systems, and more specifically, to application optimization in a network system.

Modern information handling systems (IHSs) typically employ operating systems that execute applications or other processes that may require the resources of multiple processors or processor cores. Network systems may include multiple IHSs that execute applications and manage application information. Users may access network system resources that use multiple IHSs to request application services from servers or application servers.

Network systems may include IHSs that provide application server services and other network services during application or program execution. Users, clients, or other entities may require the services of network resources such as application servers. Network systems may employ network resources, such as application delivery controllers (ADCs) and wide area network (WAN) optimizer controllers (WOCs). ADCs and WOCs may increase, accelerate, or otherwise optimize application execution performance. Application optimizations seek to improve user experience and user services during application operations.

ADCs, WOCs, and other network system resources may benefit from the efficient management of messages and corresponding network packet transfers during user, client, and server application operations. In particular, effective packet management may improve user quality of experience (QoE) and quality of service (QoS) performance characteristics during application execution in a network system. Effective application optimizer tools may significantly improve application execution efficiency in an IHS and corresponding network system.

BRIEF SUMMARY

In one embodiment, a method is disclosed that includes receiving from a first information handling system (IHS), by a second IHS, a request for application services transmitted over a communication path in a network. The method also includes populating, by the second IHS, an application table in a third IHS in the communication path, the application table storing application optimizer information received from the second IHS. In one embodiment, the populating of the application table is responsive to the request for application services. In another embodiment, the populating of the application table is not responsive to a request for application services. The method further includes generating, by the second IHS, an application response to the request for application services, the application response being directed to the first IHS. The method still further includes testing, by the third IHS, the application response to determine if the application table includes a table reference to the application response, the third IHS retrieving application optimizer information from the application table if the application table includes a table reference to the application response, the third IHS otherwise performing a deep packet inspection on the application response. The method also includes applying, by the third IHS, the application optimizer information to the application response.

In another embodiment, a network system is disclosed that includes a communication path to which a first information handling system (IHS) and a second IHS couple to enable communication between the first and second IHS, wherein the second IHS receives a request for application services from the first IHS via the communication path. The network system also includes a third IHS situated in the communication path between the first and second IHS, the third IHS including an application table that stores application optimizer information received from the second IHS in response to the request for application services. In this embodiment, the second IHS generates an application response to the request for application services, the application response being directed to the first IHS. In this embodiment, the third IHS tests the application response to determine if the application table includes a table reference to the application response. The third IHS retrieves application optimizer information from the application table if the application table includes a table reference to the application response. The third IHS otherwise performs a deep packet inspection on the application response. In this embodiment, the third IHS applies the application optimizer information to the application response.

In yet another embodiment, a computer program product is disclosed that includes a non-transitory computer readable storage medium. The computer program product also includes first instructions that receive from a first information handling system (IHS) by a second IHS a request for application services transmitted over a communication path in a network. The computer program product further includes second instructions that populate by the second IHS an application table in a third IHS in the communication path, the application table storing application optimizer information received from the second IHS, the populating of the application table being responsive to the request for application services. The computer program product still further includes third instructions generate by the second IHS an application response to the request for application services, the application response being directed to the first IHS. The computer program product also includes fourth instructions that test by the third IHS the application response to determine if the application table includes a table reference to the application response, the third IHS retrieving application optimizer information from the application table if the application table includes a table reference to the application response, the third IHS otherwise performing a deep packet inspection on the application response. The computer program product further includes fifth instructions that apply the application optimizer information to the application response. The first, second, third, fourth and fifth program instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 shows an application table that maintains application message attributes that the disclosed application optimizer method employs.

DETAILED DESCRIPTION

Figure 1:
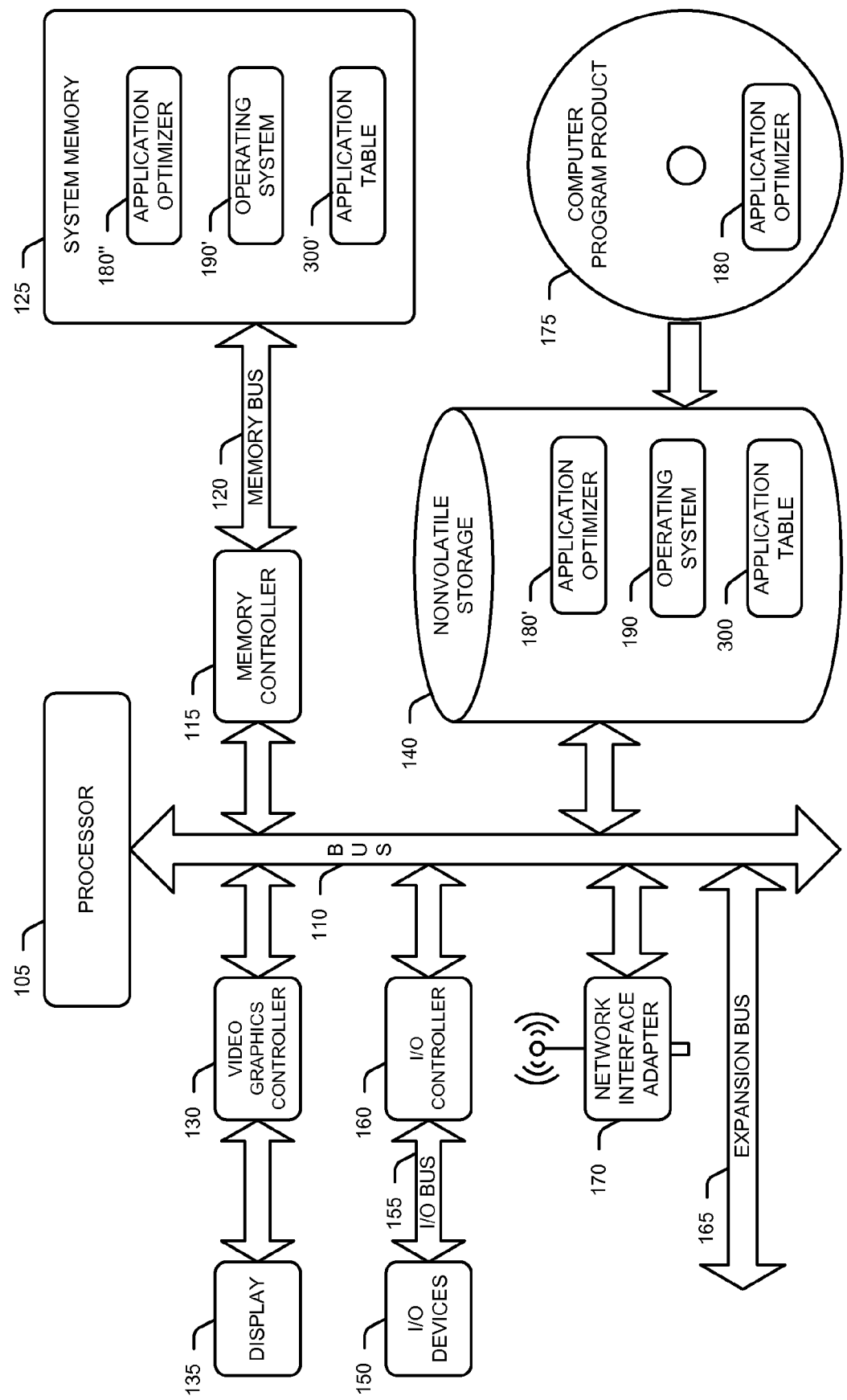
FIG. 1 shows a block diagram of a representative information handling system (IHS) that employs the disclosed application optimizer methodology.

A network system may include multiple information handling systems (IHSs). These network system IHSs may employ operating system software that executes applications or processes. These IHSs may include application optimizer software and tools that manage network system resources during application execution and application information communication within the network system. In one embodiment, a user or other entity may employ the resources of a client IHS to access application server IHS services, such as those of a JAVA application server. (Java is a trademark of the Oracle Corp.) A user may send a message from a client to a server in the form of a service request message. The user may use this service request message to communicate from client to server via one or more network packets.

Network packets may take the form of multiple protocols or configurations within the network system. For example, network packets may be in the form of Ethernet packets, hypertext transfer protocol (HTTP) packets, point to point protocol over Ethernet (PPPoE) packets, Fiber Channel packets, or many other network packet protocols.

Application optimizers are special application message managers and corresponding packet management tools. An application optimizer supports and enhances application execution operations within network system IHSs. Application optimizers include application delivery controllers (ADCs) and wide area network (WAN) optimizer controllers (WOCs). ADCs and WOCs are transparent to the user and provide application message optimizations during message communications across the network. These application message optimizations may offload the services that servers typically provide. However, this offloading of server duties comes at the expense of server processing bandwidth. ADCs and WOCs process "messages" in the form of network packets, or more simply "packets" during network system communications.

ADCs may perform common server tasks and provide load balancing between multiple servers. ADCs may provide network content manipulation, advanced packet routing and highly configurable health monitoring. ADCs may provide extensive compression, caching, multiplexing, application layer security, content switching, and other capabilities. The security features of an ADC may include a secure sockets layer (SSL) capability as well as other security protocols and mechanisms.

(WAN) optimizer controllers (WOCs) may provide functions similar to those of ADCs. However, WOCs may come in pairs that provide symmetrical services for network message communications. For example, a WOC may compress packet data on the sending end of a packet transfer, while another WOC of the WOC pair decompresses packet data on the receiving end of a packet transfer. WOCs may manage traffic shaping or traffic shaping polices for messages and their corresponding packets within the network system. For example, WOCs may slow down some message transfers or even drop messages, such as peer-to-peer communications, and their corresponding packets as policies dictate. WOCs may also provide other functions and services, such as encryption and decryption within a network system.

Like ADCs, WOCs may employ a variety of mechanisms to offload server functions and provide application acceleration benefits for servers within the network system. WOCs may reduce or eliminate redundant message transfers, eliminate stale data within local caches that support servers, compress and prioritize data, and many other server support functions as well.

In a network system, ADCs and WOCs may employ a deep packet inspection (DPI) to gather sufficient information about a particular message to determine what application optimization protocols apply to the particular message. The DPI may be compute-intensive for the ADC or WOC. Thus, a DPI may slow down a message transfer form one network system resource to another.

Network system resources may examine header information, such as 5-tuple information, included in network messages. For example messages, and more particularly their corresponding packets, may include a header area, such as 5-tuple area that includes source address, destination address, source port, destination port, and protocol information. This header information provides network resources with enough information to process the packet for routing and other common network functions. However, ADCs and WOCs may require more extensive packet analysis to determine application specific information.

ADCs and WOCs may perform DPI operations or filtering to gain access to, or inspect, information within a message or corresponding packet that does not reside within the message packet header. The message packet header typically contains routing information for the message packet and is more readily accessible than the remaining message information. ADCs and WOCs perform DPI operations as the message passes through inspection points within the ADC or WOC. The ADC or WOC may search the message for protocol information to determine that predefined protocol criteria to allow to the message management.

In one embodiment, an application optimizer tool such as application optimizer software may employ an application table that stores and maintains DPI style information for messages that transfer within the network system. The application optimizer may provide ADC IHSs and WOC IHSs with an efficient method of message interrogation and inspection during message transfer.

In one embodiment, a user or other entity employs a client IHS or "client" to send a server application request message (SARM), namely a request for application services, to an application server IHS, or "server". In this manner, the user may invoke a server application by employing a particular message. The server honors the particular message and before sending application specific message information back to the client, the server may first respond with a restful application optimizer message (RAOM) that includes application optimizer information, as described in more detail below. The server does not intend the RAOM specifically for the client, but rather for the ADCs and WOCs in the network system communication path between the server and the client. In one embodiment, if the client includes a WOC or similar resource, then the client will also receive and interpret the RAOM. The ADCs and WOCs of the network system employ an application optimizer tool that interrogates the RAOM to retrieve application optimizer information from the RAOM. The network system may implement the application optimizer tool in software or hardware depending on the particular application.

The RAOM provides ADCs and WOCs with application specific information that is useful to reduce or eliminate the need for DPI operations. The RAOM may provide application information for multiple applications, such as those within the servers, at a time. In one embodiment, ADCs and WOCs employ application optimizer software to populate application tables with application message information and corresponding packet attributes, as described in more detail below.

ADCs and WOCs may use the information within the application tables to associate messages and their corresponding packets with application protocols, server protocols, and other information. In this particular embodiment, each message corresponds to a respective packet. In another embodiment, a message may include multiple packets.

When a network resource such as a server sends a message to a client, ADCs and WOCs in the message path may perform application optimizing operations on that message. In one embodiment, the particular ADC or WOC in the message path extracts header information, such as 5-tuple header information, from the message. Header information for a particular packet or message may include information such as source and destination information for the particular packet or message. For example, the header information of a packet or message may include the source IP address, destination IP address, source port, destination port and protocol type for that packet or message. The particular ADC or WOC employs the header information to locate or index specific application optimization information for that message within the application table that the particular ADC or WOC maintains. The ADC or WOC may match one or more pieces of information from the message's header to use as index data into the application table information.

If a match is not found within a particular application table of a particular ADC or WOC, that particular ADC or WOC may then perform a more time intensive DPI operation on the non-matching message. However, if a match is found within a particular application table of a particular ADC or WOC, that particular ADC or WOO may interrogate the application table entry for the matching message. The application table entry for the matching message contains information that the particular ADC or WOC may perform to provide application optimization operations on the matching message. In other words, the ADC or WOC fetches information from the application table to determine what to do with the matching message, rather than performing a deep packet inspection (DPI).

As time proceeds and more and more servers generate more and more RAOMs, the application tables within ADCs and WOCs of the network system populate with useful and current application information. The application table information may provide the ADC or WOC with information as to how to compress, encrypt, or provide other traffic shaping or policy services to messages within the network system. In one embodiment, servers of the network system may send explicit RAOMs to update application tables within particular ADCs and WOCs to keep these application tables current and up-to-date. In this scenario, the RAOM is regarded as being an unsolicited RAOM that the server targets at a particular ADC or WOC. ADCs and WOCs may maintain caches that reflect the most current information in their respective application tables. To improve network efficiencies, servers may employ RAOMs to maintain ADC and WOC application table caches with up-to-date information.

In one embodiment, the disclosed application optimizer method improves ADC and WOC message management in a network system by application optimization in the form of application acceleration. A user requiring the application services of a server benefits from an increase in network system efficiencies. These network efficiencies impact user quality of experience (QoE) and quality of service (QoS) performance. The disclosed application optimizer method manages applications that employ dynamic port allocations. Dynamic port allocations may provide application services with address port changes during application message transfers. The disclosed method also supports the use of multiple and simultaneous port addressing within the network system.

FIG. 1 shows a network information handling system (IHS) 100 with an application optimizer 180 and an application table 300 that employs the disclosed application optimizer methodology. Application table 300 may store application optimizer information in the form of application message attributes and other information. IHS 100 includes a processor 105. In one embodiment, processor 105 may include multiple processors cores (not shown). IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array.

Processor 105 may also include local memory (not shown) such as L1 and L2 caches (not shown). A video graphics controller 130 couples a display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. Network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store information on nonvolatile storage 140. IHS 100 includes a computer program product on digital media 175 such as a CD, DVD or other media. In one embodiment, a designer or other entity configures the computer program product with application optimizer 180 software to practice the disclosed application optimizer methodology. In practice, IHS 100 may store application optimizer 180 and application table 300 on nonvolatile storage 140 as application optimizer 180' and application table 300', respectively. Nonvolatile storage 140 may also store OS 190. In one embodiment, not shown, OS 190 may include application optimizer 180.

When IHS 100 initializes, the IHS loads application optimizer 180', OS 190, and application table 300 into system memory 125 for execution as application optimizer 180", OS 190', and application table 300', respectively. During execution of application optimizer 180, IHS 100 may employ application table 300 to store message or network packet information, as described in more detail below. In accordance with the disclosed methodology, application optimizer 180 may employ application table 300 as well as other memory resources of IHS 100 to maintain network communication packet information during application execution and message communications. IHS 100 described above may be called a network system IHS in the sense that more than one of these network system IHSs may couple together to form a network, as described in more detail below.

Figure 2:
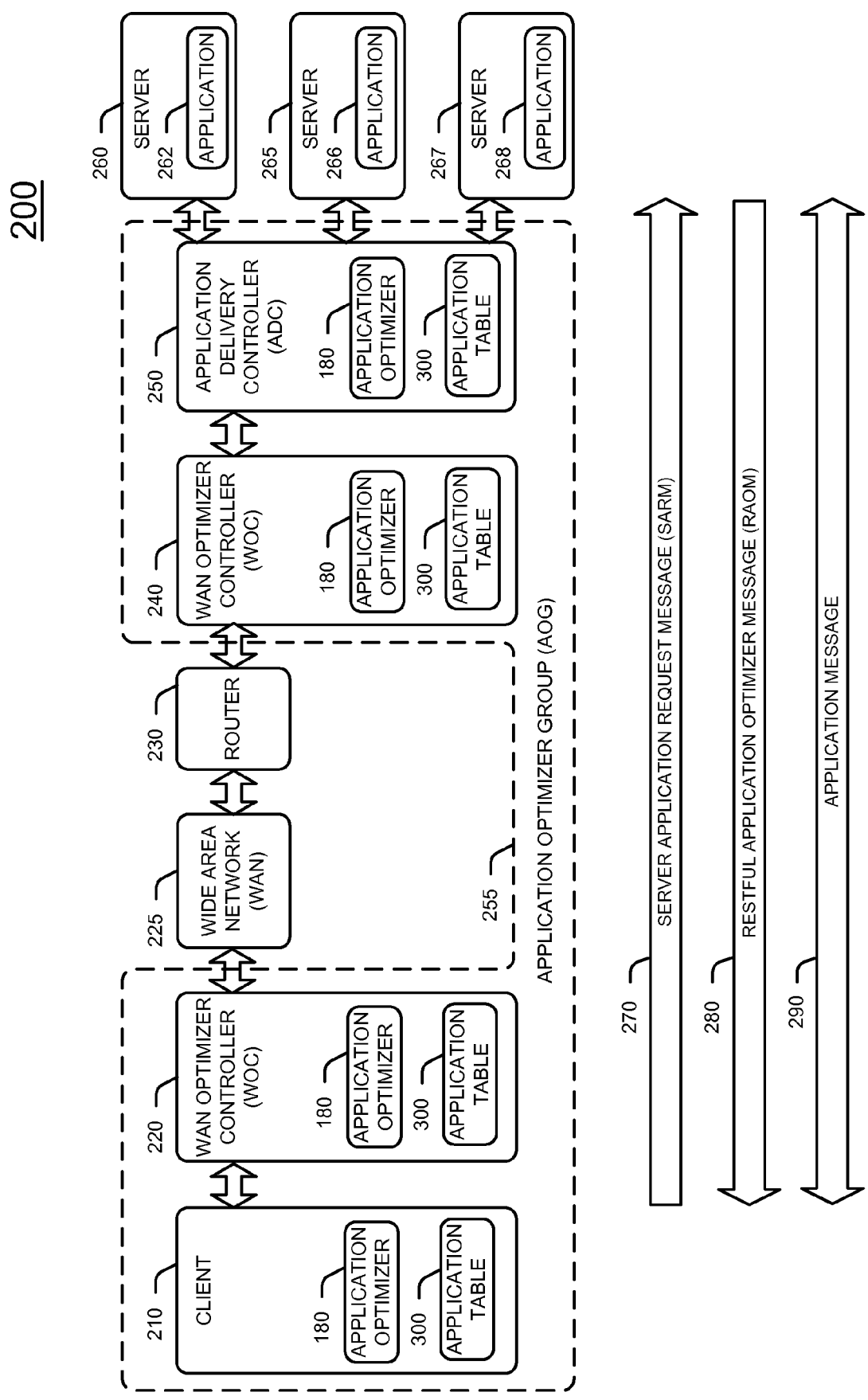
FIG. 2 shows block diagram of a network system that employs multiple IHSs that employ the disclosed application optimizer methodology.

FIG. 2 is a block diagram of network system 200 that employs multiple network system IHSs that couple together to form a network. Network system 200 includes a client IHS 210 that may provide users, clients, or other entities terminal access or other access to network system 200 resources. Client IHS 210 is a network system IHS. In one embodiment (not shown), client 210 may include a WOC or WOC functional capability. In that case, client 210 may include an application optimizer 180 and an application table 300. Application optimizer 180 may employ application table 300 to store application message attributes to practice the disclosed application optimizer methodology for client 210. WOCs may exist as physical or virtualized resources that network system 200 IHSs employ.

Network system 200 includes a wide area network optimizer controller (WOC) 220. WOG 220 is another type of network system IHS. In one embodiment, WOO 220 may include application optimizer 180 and application table 300. Application optimizer 180 may employ application table 300 to store application message attributes to practice the disclosed application optimizer methodology in WOO 220. WOO 220 couples to client 210 and wide area network (WAN) 225. WAN 225 may include multiple network resources (not shown) and provide connections and communication links between other networks, such as local area networks (LANs) (not shown).

WAN 225 couples to a router 230 that couples to another WOC 240. WOC 240 is another network system IHS in network 200. In one embodiment, WOC 240 may include application optimizer 180 and application table 300. Application optimizer 180 may employ application table 300 to store application message attributes to practice the disclosed application optimizer methodology for WOC 240. WOCs provide bi-directional network packet functions that require pair action between client and server resources of network system 200. For example, one WOC may compress a message and a corresponding partner WOC may decompress the same message. In this manner, WOCs may provide message or network packet functions that are transparent to clients, servers, and users of the network system 200 resources.

Network system 200 includes an application delivery controller (ADC) 250 that couples to WOC 240 and multiple servers, namely a server 260, a server 265, and a server 267. Server 260 includes an application 262, server 265 includes an application 266, and server 267 includes an application 268. Each application, namely application 262, 266 and 268, provides application services for their respective servers, namely corresponding servers 260, 265 and 267. ADC 250 is another network system IHS in network 200. Servers 260, 265 and 267 are also network system IHSs. In one embodiment, ADC 250 may include application optimizer 180 and application table 300. Application optimizer 180 may employ application table 300 to store application message attributes to practice the disclosed application optimizer methodology for ADC 250. ADCs and WOCs may interpret policy information that pertains or relates to a particular message and apply policy guidelines to that particular message. For example, an ADC or WOC may maintain a policy for text-based instant messaging applications that differs in priority from that of video stream application messaging. The ADC or WOC may offer messages that correspond to video streaming or video stream applications a higher priority of communication bandwidth within network system 200 than other messages, such as text-based instant messaging messages. The policy guidelines described above are an example of application optimizer information.

Client 210, WOC 220, WOC 240, and ADC 250 form a group of network system 200 IHSs that employ application optimizer 180 software and application table 300 information. Each of these network system IHSs, namely client 210, WOC 220, WOC 240 and ADC 250 is a network resource, i.e. a network resource IHS. This group of network resources, as shown enclosed by dashed lines, constitutes an application optimizer group (AOG) 255. In one embodiment, each network resource IHS within AOG 255 includes a respective application optimizer 180 and application table 300, as shown in FIG. 2. Each network resource within AOG 255 works independently or in cooperation with one another network resource to improve message handling efficiency and thereby improve application operation within network system 200. In one embodiment, each application table 300 within AOG 255 maintains identical application message attribute information. In another embodiment of the disclosed application optimizer method, each application table 300 may provide unique and specific information that pertains to the particular network system IHSs in which the application table resides. In that embodiment, the application tables 300 within the network resource IHSs of AOG 255 may each store different information.

A user or other entity may execute applications, such as application 262, 266, and 268 within one of multiple network system 200 servers, such as those of server 260, server 265, server 267, and other servers (not shown). The user may employ the resources of client 210 to generate application requests to servers or other resources of network system 200 in the form of messages or packets. Client 210 employs messages or packets to communicate with resources of network system 200. Servers of network system 200, such as server 260, server, 265, and server 267 employ messages to communicate with client 210 and other resources of network system 200.

For example, client 210 may send a server application request message (SARM) 270 to server 260 or other servers of network system 200. In one embodiment, SARM 270 is a request for application services that client 210 sends to an application in a server, such as application 262 in server 260. AOG 255 includes ADCs and WOCs that reside in the communication path of SARM 270. The ADCs and WOCs of AOG 255 may perform application optimizer operations on SARM 270. In response to SARM 270, server 260 may respond with a restful application optimizer message (RAOM) 280 that includes application optimizer information, as described in more detail below. During normal operations, client 210, server 260, server 265 or server 267 may send messages, such as an application response i.e. application message 290, between network resources of network system 200. ADCs, WOCs, and other network resources of AOG 255 that reside in the communication path of application message 290 may perform application optimizer operations on application message 290 and corresponding network packets.

FIG. 3 depicts a diagram of application attribute table 300 that stores application message attributes within network system 200. In one embodiment, the group that forms AOG 255, namely client 210, WOG 220, WOC 240, and ADC 250, each maintain an application table 300 responsive to normal user service requests of network system 200 resources. One common resource for a user to request is application services from one of multiple servers of network system 200, namely server 260, server 265 and server 267.

For example, a user may initiate an application service request by sending SARM 270 from client 210 to server 260. SARM 270 may include one or more packets that communicate a user's application request to server 260. Network system 200 resources monitor SARM 270 and route the corresponding packet or packets from client 210 to server 260. Typically the resources of network system 200 employ the header information, such as the 5-tuple information in each packet of SARM 270, to determine the destination port or destination ID and properly align that destination with server 260, as in this example.

In one embodiment, the information in FIG. 3 shows only one table entry of application table 300 that corresponds to a particular message. The particular message and corresponding network packet transfer in turn corresponds to a particular application executing within one or more servers of network system 200. Application table 300 may include multiple table entries that correspond to multiple messages, such as message header information.

In one embodiment of the disclosed application optimizer method, server 260 responds to SARM 270 with RAOM 280. RAOM 280 may include sufficient information to populate one or more entries of application table 300 and avoid the need for deep packet inspection (DPI) operations. IHSs of AOG 255 may employ header information within messages, such as application message 290, to determine indexing into application table 300. In another embodiment, server 260 may issue an explicit RAOM 280 that is not in response to SARM 270. In other words, server 260 or other server of network system 200 may issue a periodic and/or explicit RAOM 280 or other restful application optimizer messages. Stated alternatively, server 260 or other server of network system 200 may issue an RAOM 280 on its own initiative and send the explicit RAOM 280 to a particular ADC or WOC. ADCs, WOCs, and other network resource IHS of AOG 255 may employ these restful application optimizer messages to update application table 300 contents.

Although header information may vary from one network protocol to another, header information includes source and destination addressing and port information as well as application or transport protocol information. Application table 300 may include header information such as shown in the first 5 rows of application table 300. For example, application table 300 includes source Internet protocol (IP) address or source IP, as shown in row 310. Application table 300 includes source port and destination IP address information, as shown in row 311 and row 312, respectively. Application table 300 includes destination port and application protocol information, as shown in rows 313 and 314, respectively.

In one embodiment, application table 300 includes application information that may identify the particular corresponding application executing in servers of network system 200 for a particular packet, as shown in row 315. Application table 300 includes compressibility information that provides compression protocols, as shown in row 316. This compressibility information is one example of application optimizer information that application table 300 stores. In one embodiment, the compressibility information provides explicit compression information that pertains to a particular packet or message. In this manner application optimizer 180 may avoid compression parameter testing. Application table 300 includes data length, and queue length information that corresponds to a particular message or network packet, as shown in rows 317 and 318 respectively. The data length and queue length information are other examples of application optimizer information.

Application table 300 includes network system health, measured network latency, requested bandwidth, cache updates, and other information that corresponds to a particular packet or message and application within network system 200, as shown within rows 319, 320, 321, 322 and 323, respectively. Application table 300 information may provide protocol, policy, or other information that IHSs of AOG 255 may employ to improve message management during communications within network system 200.

Although many arrangements of application table 300 are possible, in one embodiment application table 300 indexes each table entry by the destination port address or destination port, as shown in row 313. In this manner, each message destination port address provides a relatively easy lookup method that uses the header information of each packet or message to determine other useful information regarding the application in process. In other embodiments, application optimizer 180 may employ any or all data within the application message 290 header to index specific application table information.

IHSs within AOG 255 may employ the information that application table 300 maintains or stores to determine particular application message protocols. Application message 290 may provide lookup information for table 300 to identify the particular corresponding application that a server executes. The particular application may execute within server 260, or other servers of network system 200. IHSs of AOG 255 may make decisions on compressibility, encryption, communication priority, etc. in real time or on-the-fly during application message 290 transfer. This on-the-fly capability provides improvements to user quality of experience (QoE) and quality of service (QoS) performance measures.

QoE, which is sometimes referred to as quality of user experience, is a subjective measure of user experience during execution of applications by network system resources in a network system such as network system 200. Increasing application execution performance typically translates to increases in user QoE performance. QoS is a more objective measure of service performances that a network system provides than QoE. For example, QoS performance may relate to the measure of network message traffic shaping efficiency and not rely on the benefits that users or other entities perceive.

Figure 4:
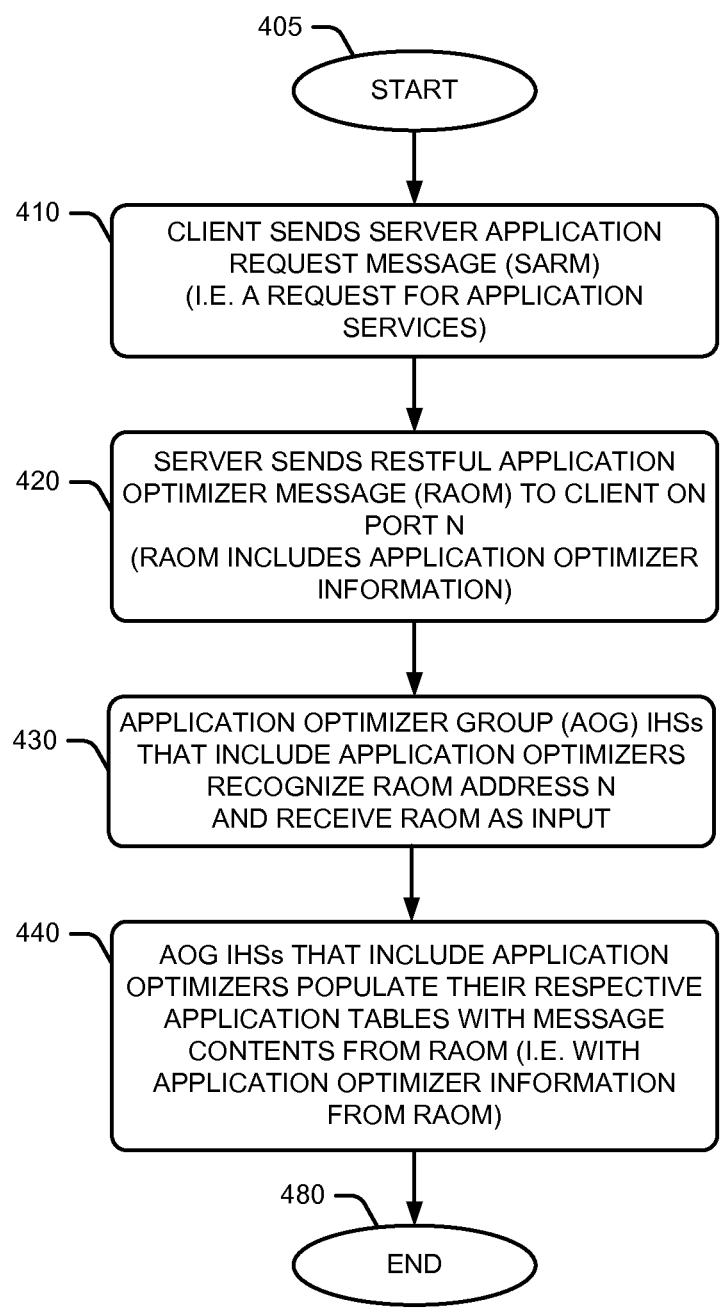
FIG. 4 depicts a flowchart of an embodiment of the disclosed application optimizer method that provides application table population.

FIG. 4 is a flowchart that shows process flow in an embodiment of the disclosed application optimizer methodology that provides application optimization in a network system. More specifically, the flowchart of FIG. 4 shows how the application optimizer tool 180 that IHSs of network system 200 employ populates application table 300. In more detail, ADCs, WOCs, and other IHSs of AOG 255 employ application optimizer 180 along with SARM 270 and RAOM 280 messages as input for populating application table 300.

The disclosed application table population method starts, as per block 405. Client 210 sends a server application request message (SARM) 270, as per block 410. For example, client 210 may send SARM 270 to server 260. In this manner, a user or other entity employs resources, such as terminal resources of client 210, to form or generate an application request. For example, the application request may require a server such as server 260 to perform application operations in response to SARM 270 information. Client 210 may employ one or more packets that communicate via a communication path through network system 200 to server 260 in order to perform the application service request.

Server 260 responds to SARM 270 from client 210 with a return message, such as a restful message. In more detail, server 260 sends restful application optimizer message (RAOM) 280 to client 210 on port N, as per block 420. N represents a particular port number that each of the IHSs of AOG 255 recognize as belonging to a restful message, such as RAOM 280. In this manner, resources of network system 200 may recognize the unique address of port N as a return restful message in response to an application service request. Any IHS of AOG 255 that includes application optimizer 180 recognizes RAOM 280 address N and receives RAOM 280 as input, as per block 430. In one embodiment, AOG 255 includes client 210 that may include an application table 300 and receive RAOM 280 as well. Network resources, such as IHSs that manage application tables, namely client 210, ADC 250, WOC 220, and WOC 240 of AOG 255 may receive and read restful messages, such as RAOM 280, and extract information from that message to populate their respective application tables 300 with application message attribute information. In one embodiment, network resource IHSs such as servers of network system 200 may issue restful messages such as RAOM 280 without solicitation by other network resources. Network system 200 resources may employ these explicit restful messages to maintain or refresh application table 300 contents within AOG 255. In this embodiment, RAOM 280 or other restful messages may be generated by a server without solicitation by a network resource sending an SARM 270 to that server. Such an RAOM 280 or restful message is thus generated by a server not in response to a SARM 270. In other words, the server autonomously generates the RAOM 280 and sends the RAOM to a particular ADC or WOC in AOG 255.

Each of the IHSs of AOG 255 that include application optimizer 180 populates its respective application table with message contents of RAOM 280, as per block 440. For example, ADC 250 may intercept RAOM 280 and populate application table 300 within ADC 250 with application message attribute information as shown in the application attribute table of FIG. 3. Other IHSs of network system 200 AOG 255 may maintain application attribute information in their respective attributes tables 300. These IHSs may also intercept, extract, and populate application table information from the data of RAOM 280. In the disclosed network systems, to "terminate" means that a message transfer ends at a resource of a destination port. In one embodiment, network system 200 does not intend RAOM 280 to terminate at any particular port N or other port address. However, RAOM 280 terminates when each of the network resources that manage application table information, such as those of AOG 255, has an opportunity to interrogate RAOM 280.

The disclosed application table population method ends, as per block 480. In the disclosed embodiment, application optimizer 180 stores dynamically changing application attribute information corresponding to user service requests. The disclosed methodology employs the information within restful message RAOM 280 to populate local application table 300 information. The method also provides IHSs within network system 200 with information to determine best application optimization protocol decisions during message transfers.

Figure 5:
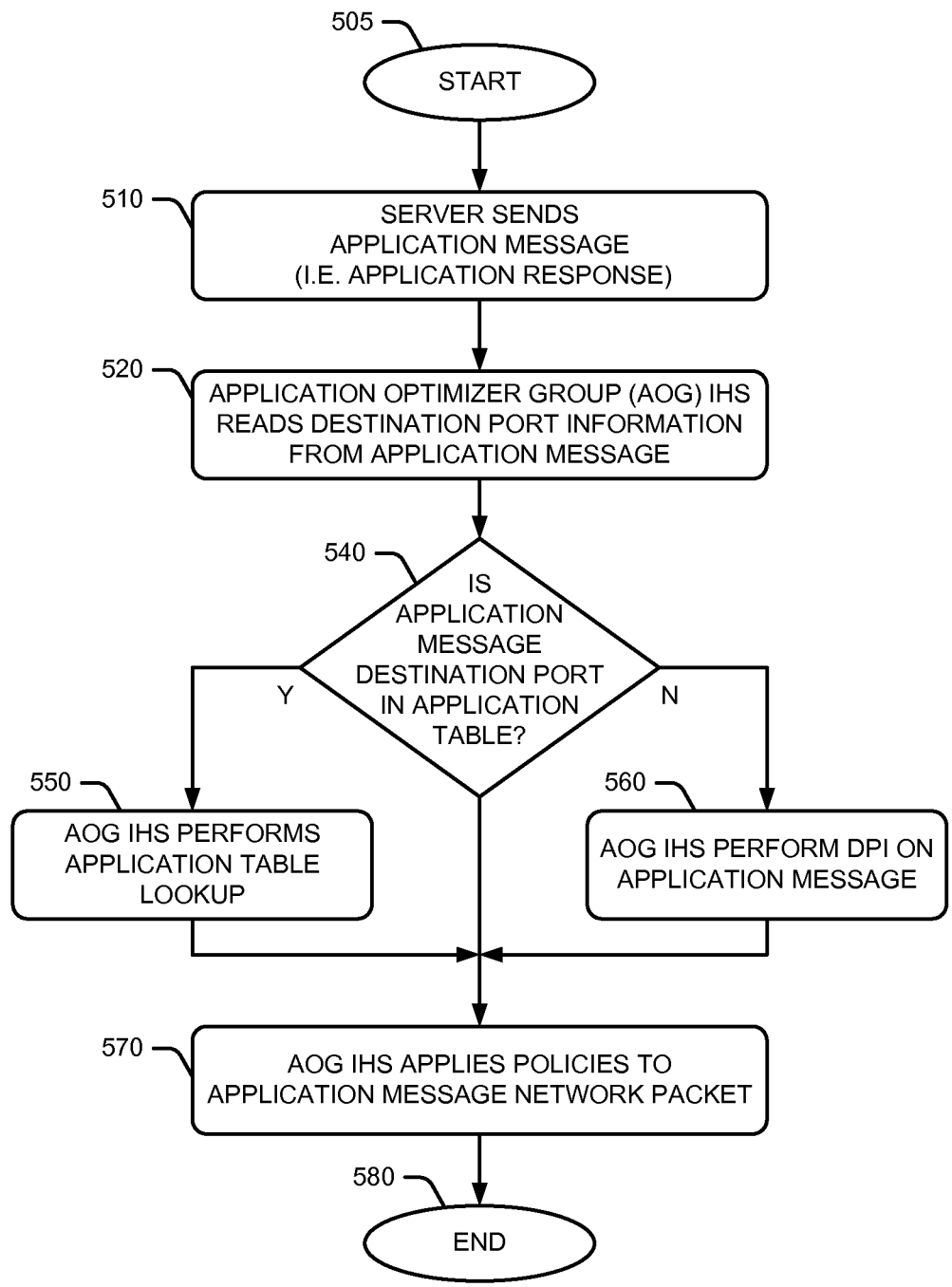
FIG. 5 depicts a flowchart of an embodiment of the disclosed application optimizer method that provides network system application optimization.

FIG. 5 is a flowchart that shows process flow in an embodiment of the disclosed application optimizer methodology that provides application optimization in a network system. More specifically, the flowchart of FIG. 5 shows how application optimizer 180, that IHSs of network system 200 employ, provides for packet protocol management from the information of application table 300. More specifically, the disclosed method provides for detailed network protocol packet management from information within application table 300 on a per message or per network packet transfer basis within network system 200.

The disclosed application optimizer method starts, as per block 505. A server sends an application message, i.e. an application response, in response to a request for application services or an SARM received from the client, as per block 510. In one case, server 260 may send application message 290 to another resource within network system 200, such as client 210. In one embodiment, a sending resource of network system 200, such as server 260 sends application message 290 or an application response to a receiving resource of network system 200, such as client 210. Those network resources within network system 200 that include application tables 300 may read network packets to determine proper application optimization management. For example, a network system IHS of AOG 255, such as client 210, ADC 250, WOC 220, or WOC 240 may apply application optimization resources to any particular message, such as application message 290. In another embodiment, client 210 may send a message such as application message 290 to an application server such as server 260.

In one embodiment, a network system IHS of AOG 255 reads destination port information from application message 290, as per block 520. For example, ADC 250 may intercept application message 290 and read header information in the corresponding network packet to determine the destination port information that application message 290 employs. The intercepting resource, such as an ADC or WOC, may test application message 290 for destination port information. In one embodiment, the network IHSs of AOG 255, in the communication path of application message 290 perform an application table 300 indexing or lookup test. In particular, each application optimizer 180 tests to determine if the destination port information from application message 290 points to an entry within its respective application table 300, as per block 540.

In one embodiment, application table 300 may provide port mapping for messages, such as application message 290, that pass through AOG 255. In other words, each application optimizer 180 may inspect application message 290 and determine from the header information what port mapping aligns with a particular application. In more detail, information within application table 300 may provide resources of AOG 255 with information that directs a particular application to a particular port. For example, application message 290 may include header information corresponding to port 80 that application optimizer 180 identifies as a video streaming application.

If an IHS of AOG 255 finds a match or corresponding entry within its respective application table 300, then application optimizer 180 of the AOG 255 IHS performs an application table 300 lookup, as per block 550. For example, ADC 250 may inspect application message 290 and determine that the destination port information of application message 290 corresponds to a table entry in respective application table 300. In that case, application optimizer 180 directs ADC 250 resources to perform an application table 300 lookup operation and to read or recover the application table 300 application message attributes as shown in FIG. 3.

However, if an IHS of AOG 255 that intercepts application message 290 determines that there is no match or corresponding entry within its respective application table 300, then the intercepting ADC, WOC or other IHS of AOG 255 may perform a deep packet inspection (DPI). The intercepting IHS or AOG 255 IHS performs deep packet inspection DPI on application message 290, as per block 560. For example, ADC 250 may perform DPI operations on application message 290 and its constituent network packet. DPI often requires time intensive analysis of messages, such as application message 290, and may restrict or otherwise impede some application optimization efforts.

Since AOG 255 IHS attribute table 300 lookups do not require network packet examination, they are more efficient and consume less time than DPI operations. This reduction in DPI operations improves application efficiencies, particularly with respect to communication bandwidth utilization in network system 200. In this manner, users and other entities may see improvements in server application execution speeds. Application execution speed improvements or accelerations translate to improvements in QoE and QoS performance measures.

AOG 255 IHS attribute table 300 lookups do not require multiple read operations. For example, ADC 250 may determine application message 290 attributes in a single lookup operation or single state. In this manner, ADC 250 and other IHSs of AOG 255 may be stateless, and thus do not require multiple states or processing cycles to determine message attributes during network system 200 communications.

In one embodiment, AOG 255 resources such as ADCs and WOCs, read destination port information from the header information of messages, such as application message 290. In other embodiments, application optimizer 180 may direct ADC and WOC resources to organize and index application table 300 by information other than destination port information, such as destination IP or any other information that application message 290 and corresponding network packets provide.

Each IHS of AOG 255 that intercepts and interrogates application message 290 applies policies to application message 290 and its constituent network packet, as per block 570. In other words, each AOG 255 IHS completes a DPI or retrieves application table 300 application attributes that correspond to application message 290. Application optimizer 180 instructs the intercepting AOG 255 IHS to apply the policies and protocols that correspond to the information as shown in application table 300. For example, depending upon compressibility protocol, ADC 250 may compress the information of application message 290 before allowing application message 290 to continue along the communication paths of network system 200. In another example, ADC 250 may perform encryption or decryption upon the contents of application message 290 depending upon the application message attributes within application table 300 of ADC 250. Many other policy and protocol objectives are possible within the disclosed application optimizer method.

ADCs and WOCs continue applying network packet policies on each application message that passes through AOG 255, such as client 210, ADC 250, WOC 220 and WOC 240. The disclosed application optimizer method ends, as per block 580. In this manner, application optimizer 180 provides protocol and policy information on a per application message basis for application messages, such as network packet transfers within network system 200. For each application message and corresponding network packet that passes through network system 200 resource that employs the disclosed methodology, efficient protocol packet management is possible. Ultimately, improved network packet protocol management translates to improvements in server application execution by improving performance of AOG 255, and particularly ADC and WOC operations within network system 200. The user benefits from improvements in application execution rates, such as those of applications 262, 266 and 268 and both QoE and QoS performance measures.

In one embodiment, client 210 or other network resource IHSs may include ADC, WOC, or similar functional capability in either a physical or virtualized form within the network resource IHS itself. In that case, those IHSs that include ADC, WOC, or similar capability may employ the same application optimization features per the disclosed application optimizer methodology.

As will be appreciated by one skilled in the art, aspects of the disclosed application optimizer methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 and FIG. 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 4 and FIG. 5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 and FIG. 5 described above.

The flowcharts of FIG. 4 and FIG. 5 illustrates the architecture, functionality, and operation of possible implementations of systems, methods and computer program products that perform network analysis in accordance with various embodiments of the present invention. In this regard, each block in the flowcharts of FIG. 4 and FIG. 5 may represent a module, segment, or portion of code, which comprises one or more executable instructions for implementing the specified logical function(s). It should also be noted that, in some alternative implementations, the functions noted in the block may occur out of the order noted in FIG. 4 and FIG. 5. For example, two blocks shown in succession may, in fact, be executed substantially concurrently, or the blocks may sometimes be executed in the reverse order, depending upon the functionality involved. It will also be noted that each block of FIG. 4 and FIG. 5 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
defining an application optimizer group (AOG) that includes:
a first information handling system (IHS) client on a client side of the AOG;
a first WAN optimizer controller (WOC) coupled to the first IHS client;
a second IHS server on a server side of the AOG;
a third IHS application delivery controller (ADC) coupled to the second IHS server;
a second WOC coupled to the third IHS ADC;
the first IHS client, the first WOC, the second IHS server, the third IHS ADC and the second WOO being situated in a communication path in a network;
receiving from the first IHS client by the second IHS server, a server application request message (SARM) transmitted over the communication path in the network;
periodically broadcasting, by the second IHS server to each member of the AOG, an unsolicited restful application optimizer message (RAOM) that includes application optimizer information defining a compression protocol for a particular port;
receiving, by the third IHS, the RAOM;
populating an application table in the third IHS ADC with the application optimizer information from the RAOM, wherein members of the AOG maintain identical application tables storing application optimizer information;
generating, by the second IHS server, an application response to the server application request message (SARM), the application response being directed to the first IHS client over the communication path in the network;
intercepting, by the third IHS ADC, the application response;
extracting, by the third IHS ADC, from the application response, header information including a destination port;
determining, by the third IHS ADC, whether the extracted header information matches application message optimizer information in the application table of the third IHS ADC;
and in response to determining that a match exists, the third IHS ADC retrieving the application optimizer information from the application table and not performing a deep packet inspection;
and in response to determining that a match does not exist, the third IHS ADC performing a deep packet inspection on the application response to determine application optimizer information; and
applying, by the third IHS ADC, the application optimizer information to the application response by compressing the application response in accordance with the defined compression protocol.

2. The method of claim 1, further comprising storing, by the application table of the third IHS, dynamically changing application attribute information that corresponds to requests for application services received by the second IHS.

3. A network system including an application optimizer group (AOG) comprising:
a first information handling system (IHS) client on a client side of the AOG;
a first WAN optimizer controller (WOC) coupled to the first IHS client;

a second IHS server on a server side of the AOG;
a third IHS application delivery controller (ADC) coupled to the second IHS server;
a second WOO coupled to the third IHS ADC;
the first IHS client, the first WOC, the second IHS server, the third IHS ADC) and the second WOO being situated in a communication path in a network;
wherein the second IHS server receives from the first IHS client, a server application request message (SARM) transmitted over the communication path in the network;
wherein the second IHS server periodically broadcasts to the AOG, an unsolicited restful application optimizer message (RAOM) that includes application optimizer information defining a compression protocol for a particular port;
wherein the third IHS ADC receives the ROAM;
wherein the third IHS ADC populates an application table in the third IHS ADC with the application optimizer information from the RAOM, wherein members of the AOG maintain identical application tables storing application optimizer information;
wherein the second IHS server generates an application response to the server application request message (SARM), the application response being directed to the first IHS client over the communication path in the network;
wherein the third IHS ADC intercepts the application response;
wherein the third IHS ADC extracts from the application response, header information including a destination port;
wherein the third IHS ADC determines whether the extracted header information matches application message optimizer information in the application table of the third IHS ADC;
wherein in response to determining that a match exists, the third IHS ADC retrieves the application optimizer information from the application table and does not perform a deep packet inspection;
wherein in response to determining that a match does not exist, the third IHS ADC performs a deep packet inspection on the application response to determine application optimizer information; and
wherein the third IHS ADC applies the application optimizer information to the application response by compressing the application response in accordance with the defined compression protocol.

4. The network system of claim 3, wherein the application table of the third IHS stores dynamically changing application attribute information that corresponds to requests for application services received by the second IHS.

* * * * *